Figure 1:
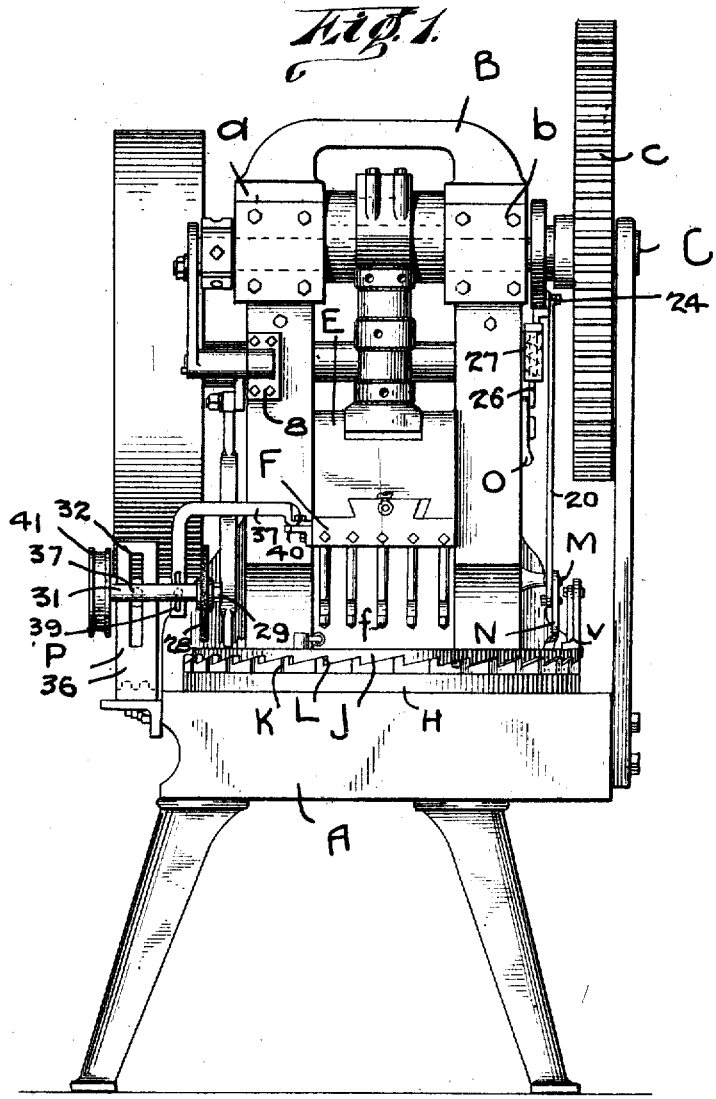

A. L. MOWRY.
MACHINE FOR SLOTTING NUTS.
APPLICATION FILED OCT. 12, 1907.

910,941.

Patented Jan. 26, 1909.

8 SHEETS—SHEET 1.

Witnesses:

Albert L. Mowry.
Inventor,

By

Attorney

A. L. MOWRY.
MACHINE FOR SLOTTING NUTS.
APPLICATION FILED OCT. 12, 1907.

910,941.

Patented Jan. 26, 1909.
8 SHEETS—SHEET 2.

Witnesses:
Wm. A. Wyman
J. H. Glen

Albert L. Mowry,
Inventor,

By Fred Falkenstenburgh
Attorney

A. L. MOWRY.
MACHINE FOR SLOTTING NUTS.
APPLICATION FILED OCT. 12, 1907.
910,941.
Patented Jan. 26, 1909.
8 SHEETS—SHEET 3.
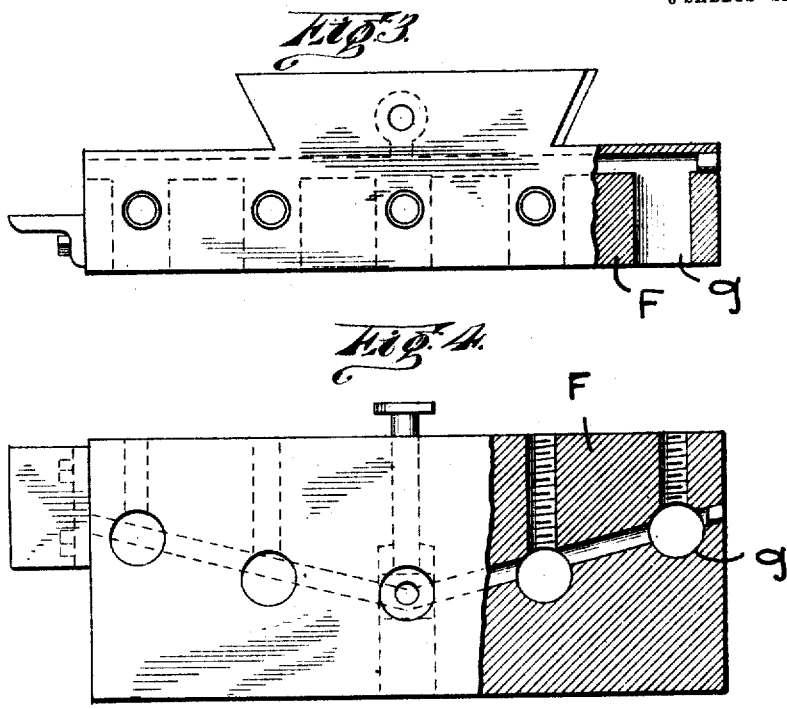
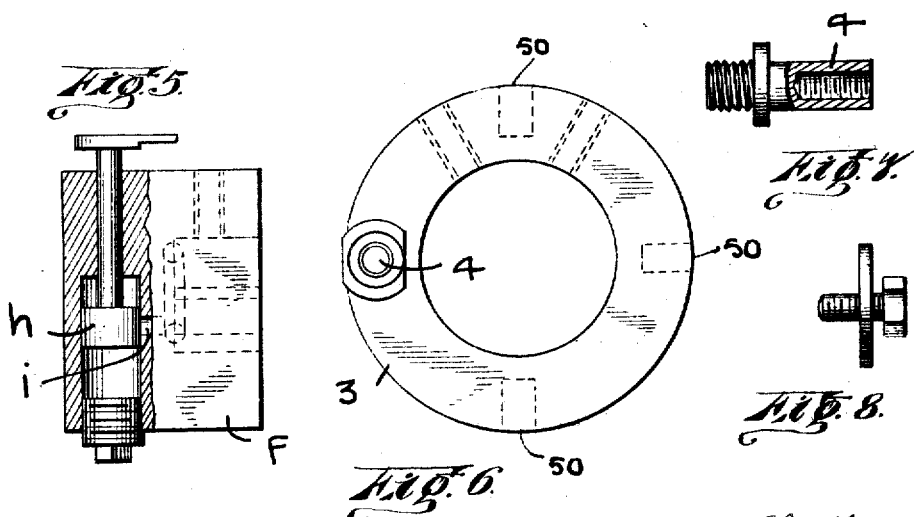
Witnesses:
Albert L. Mowry,
Inventor,
By
Attorney A. L. MOWRY.
MACHINE FOR SLOTTING NUTS.
APPLICATION FILED OCT. 12, 1907.
910,941.
Patented Jan. 26, 1909.
8 SHEETS—SHEET 4.
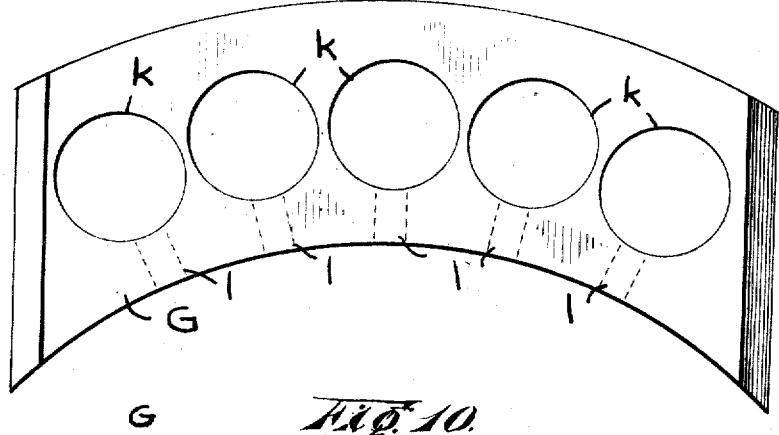
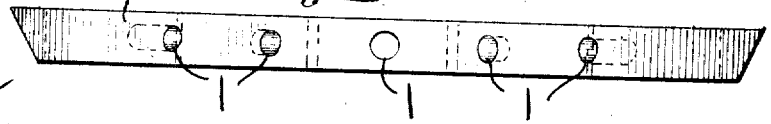
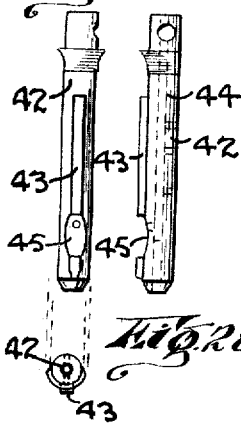
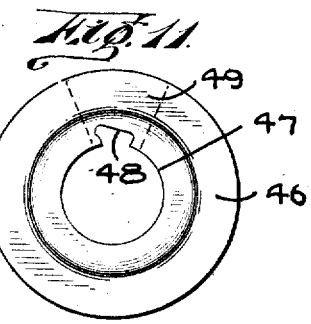
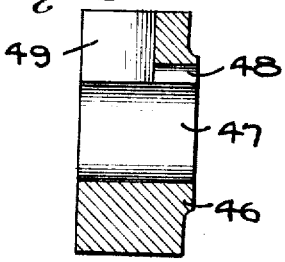
Witnesses:
Albert L. Mowry
Inventor,
By
Attorney

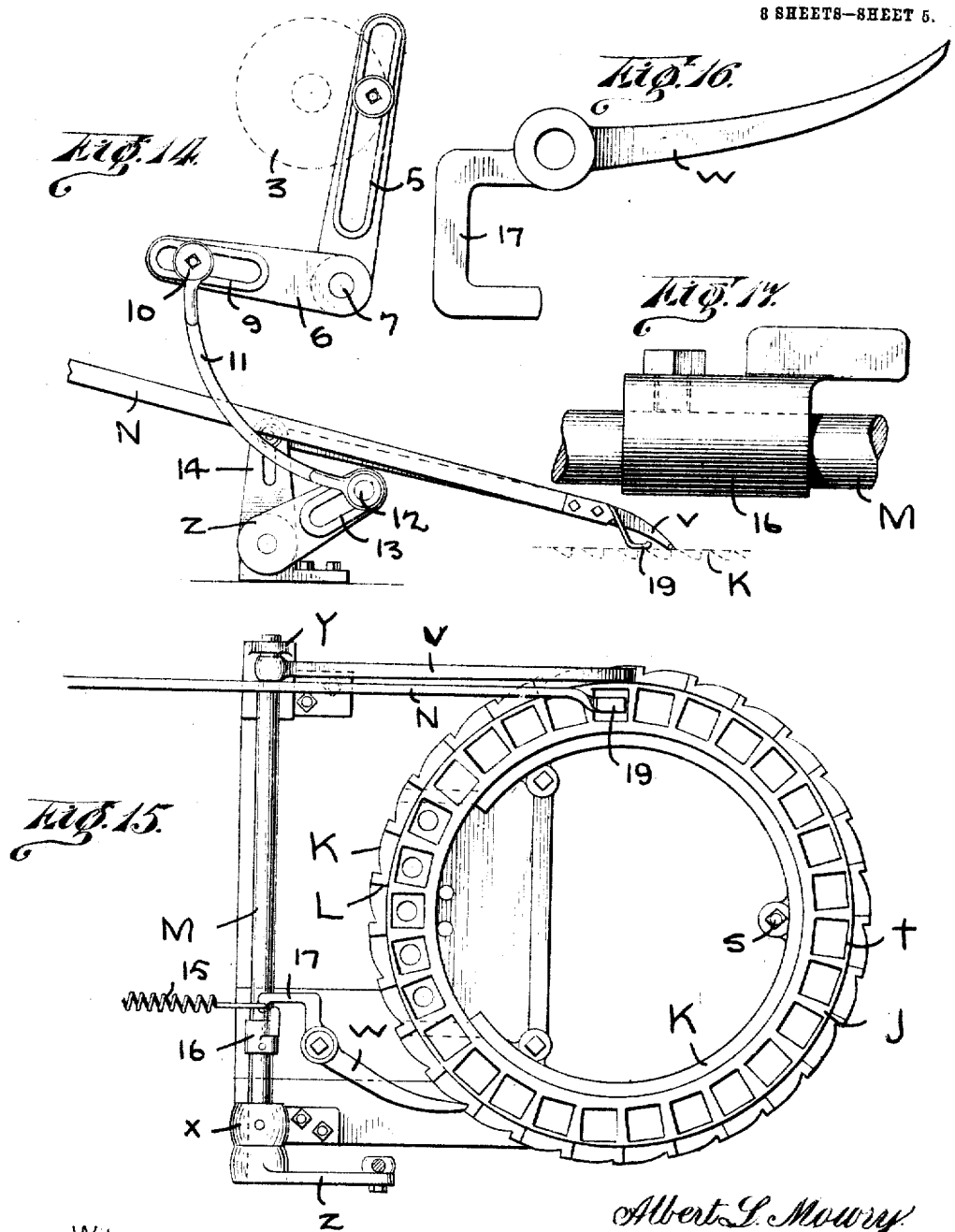

A. L. MOWRY.
MACHINE FOR SLOTTING NUTS.
APPLICATION FILED OCT. 12, 1907.
910,941.
Patented Jan. 26, 1909.
8 SHEETS—SHEET 6.
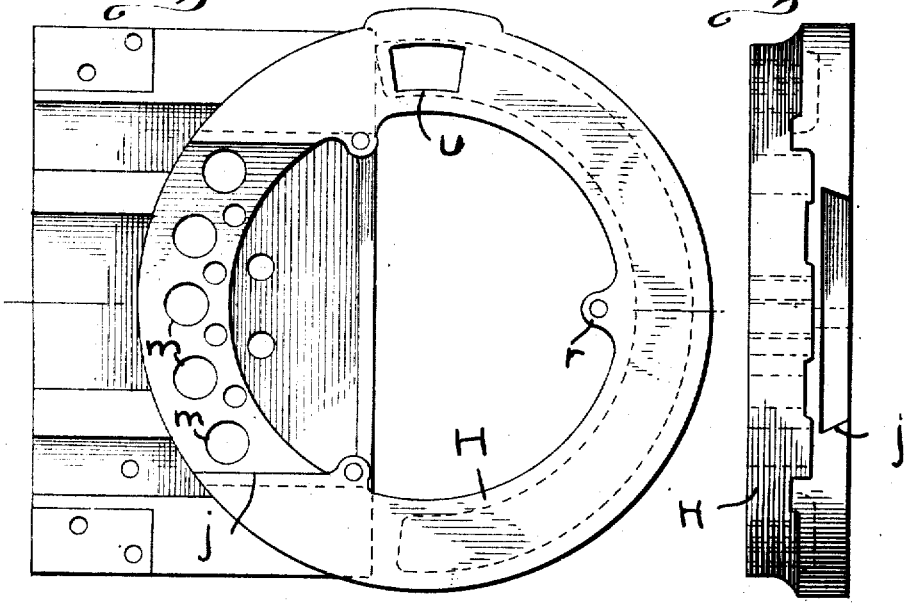
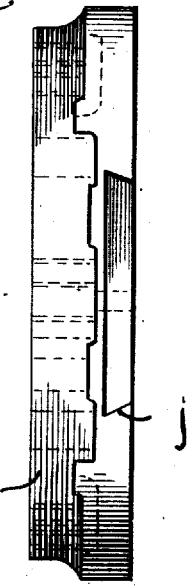
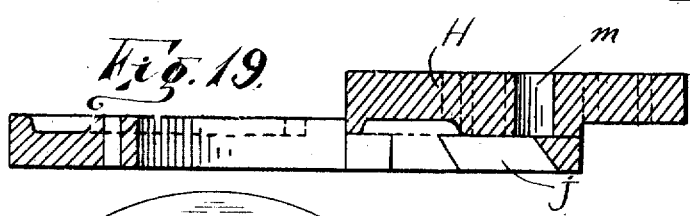
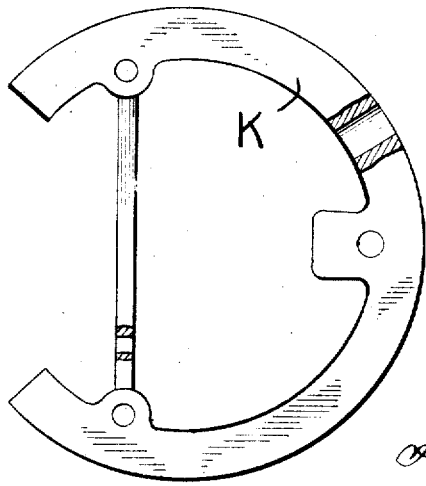
Witnesses.
Wm. A. Wyman
J. H. Gleason
Albert L. Mowry
Inventor,
By Fred Fahnestock
Attorney

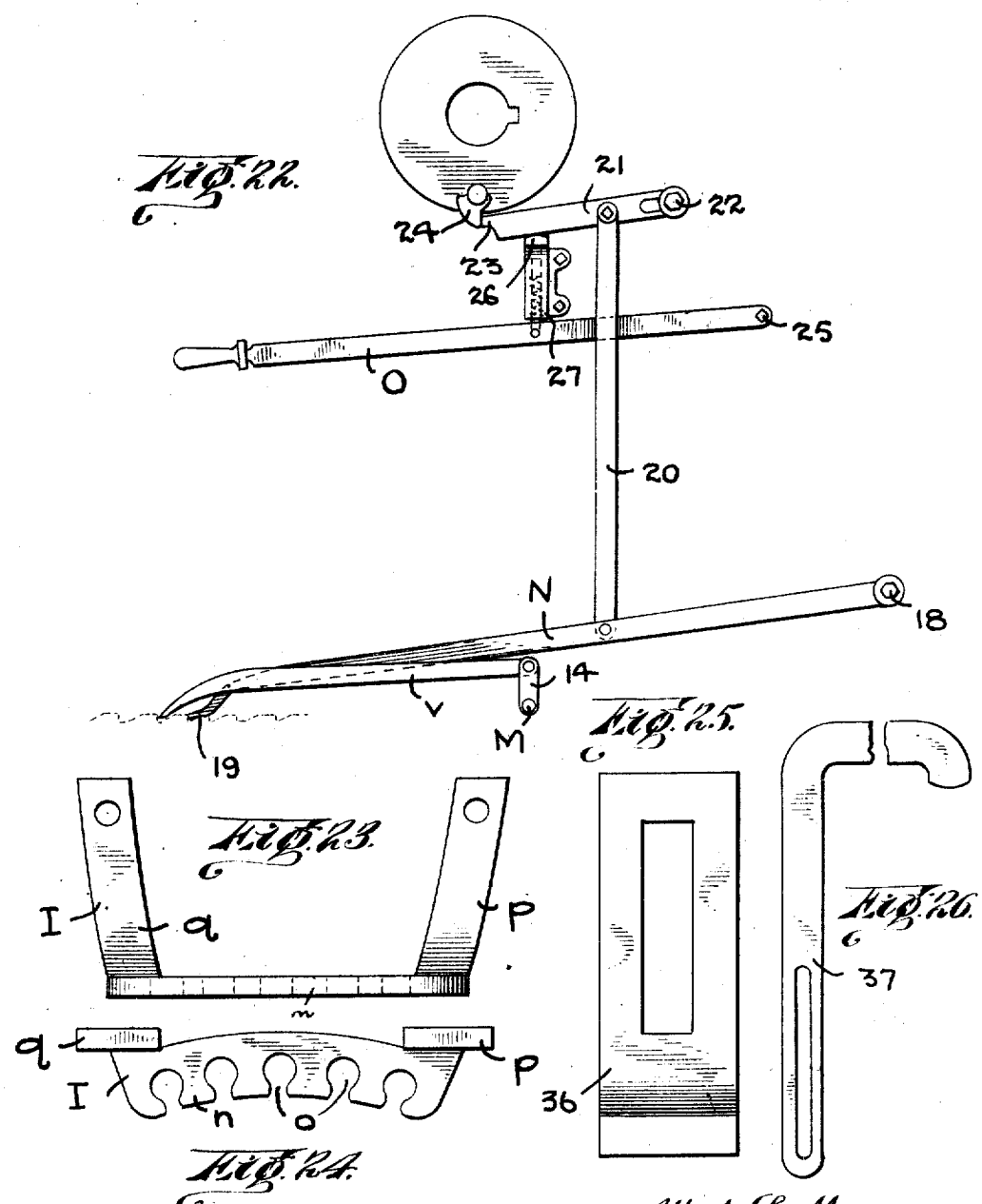

A. L. MOWRY.
MACHINE FOR SLOTTING NUTS.
APPLICATION FILED OCT. 12, 1907.

910,941.

Patented Jan. 26, 1909.
8 SHEETS—SHEET 8.

WITNESSES

INVENTOR
A. L. MOWRY.

BY

ATTY

UNITED STATES PATENT OFFICE.

ALBERT LAWRENCE MOWRY, OF ST. JOHN, NEW BRUNSWICK, CANADA, ASSIGNOR TO HARRY RICHARDS McLELLAN, OF ST. JOHN, CANADA.

MACHINE FOR SLOTTING NUTS.

No. 910,941.

Specification of Letters Patent. Patented Jan. 26, 1909.

Application filed October 12, 1907. Serial No. 397,160.

*To all whom it may concern:*

Be it known that I, ALBERT LAWRENCE MOWRY, of the city of St. John, in the county of St. John, Province of New Brunswick, Canada, have invented certain new and useful Improvements in Machines for Slotting Nuts, of which the following is a specification.

This invention relates to improvements in machines for slotting nuts particularly adaptable for the manufacture of lock nuts in which a locking pin operates in a slot provided in the side of the nut, and the objects of my invention are to provide a machine in which the opreation of slotting may be carried out continuously and automatically, whereby the nuts may be produced with great rapidity at an exceedingly low cost.

A further object of the invention is to provide means for lessening the wear on the punches used in the slotting operation whereby their life may be extended and the cost of production reduced.

A further object still is to provide means for checking the operation of the machine whereby, if the punches should fail to register with the nuts to be punched, the operation of the machine may be automatically suspended.

An embodiment of my invention for attaining these objects is illustrated herein and consists essentially of a reciprocating punch block having a plurality of punches therein, and teeth on each punch being adapted to take a cut of successively increased depth, dies coöperating with the punches, a nut carrying ring having a plurality of nut carrying pockets, a bolster plate supporting the nut carrying ring and having a slot therein through which the completed nuts are adapted to drop, reversed ratchet wheels formed on the ring, pawls coöperating therewith, means for actuating the pawls to impart an intermittent movement to the ring, a lever having an end adapted to ride on the ring and extend successively in the pockets therein, means operated by the raising of the said lever for throwing the punch out of operation, a grinding wheel, and means for bringing the same in contact with each nut to remove the scale from the surface of the nut where the slot is to be cut.

The detail of this construction together with others necessary to the attainment of the invention are hereinafter set forth in the accompanying specifications and drawings.

Figure 2:
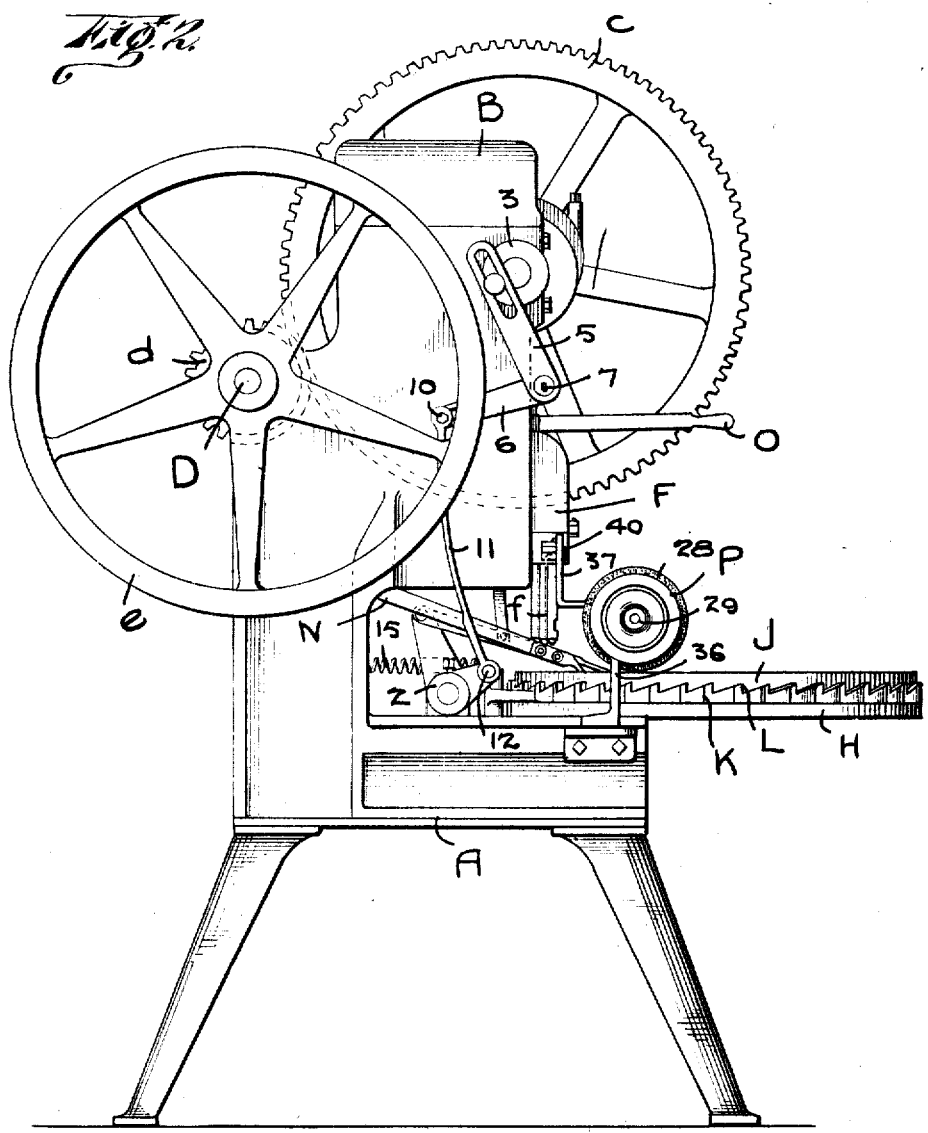
Figure 29:
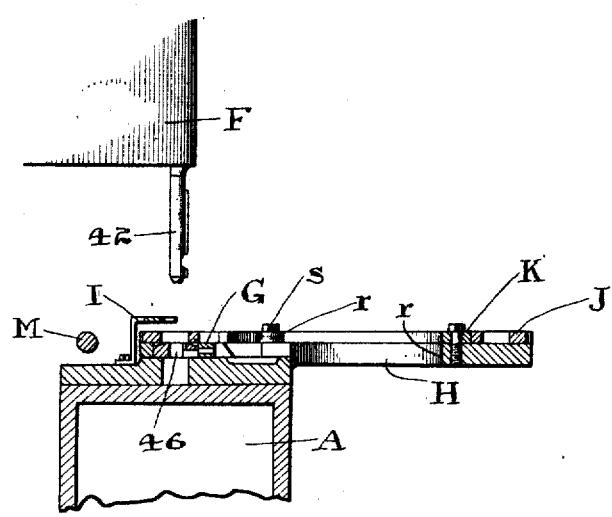

In the drawings, Figure 1 shows a front elevation of the machine. Fig. 2 shows a side elevation. Fig. 3 shows an enlarged detail of the top of the punch block. Fig. 4 shows an enlarged detail of the side of the punch block. Fig. 5 is an enlarged detail, partially in section, illustrating the piston valve controlling the flow of lubricating oil. Fig. 6 is a plan view of the disk on the crank shaft used for operating one of the pawls. Fig. 7 is a detail of a pin in the side of said disk. Fig. 8 shows a detail of the bell and plate adapted to form the connecting means between the disk and the operating bell crank. Fig. 9 is a plan view of the die holder. Fig. 10 shows a side view of the same. Fig. 11 shows a top view of one of the dies. Fig. 12 shows a sectional view through the same. Fig. 13 shows a side view of the die in its reversed position. Fig. 14 is a detail of the pawl-operating mechanism. Fig. 15 is a plan view of the same. Fig. 16 is a detail of one of the pawls. Fig. 17 is a detail of a tappet used to intermittently operate the pawl. Fig. 18 is a top view of the bolster plate supporting the nut carrying ring. Fig. 19 is a transverse sectional view through the same. Fig. 20 is a side view. Fig. 21 is a plan view of the bearing plates inserted on the inner side of the neck ring. Fig. 22 shows in detail the means for preventing the operation of the machine should the punches fail to register with the nuts. Fig. 23 shows an elevation of the nut stripper. Fig. 24 shows a plan view of the same. Fig. 25 shows a detail of the bearing bracket for the grinding wheel. Fig. 26 shows a detail of the connecting lever between the grinding wheel and the punch by which the same is raised and lowered. Fig. 27 shows a front view of the punch. Fig. 28 shows a side view of the same. Fig. 29 is a sectional detail view showing stripper plate in assembled relation with other parts.

In the drawings like letters and figures of reference indicate corresponding parts in each figure.

Referring in particular to Figs. 1 and 2, A is the main frame of the punch which can be of any suitable construction and which supports the upper bracket B in which are bearings $a$ and $b$ for the crank shaft C. This crank shaft, as usual, has a gear c thereon which meshes with a pinion d on the main shaft D on which the driving pulley e is secured. E is a ram operated by the crank shaft on the lower end of which is a punch block F supporting a plurality of punches f.

The details of my machine thus far described are common to any of the ordinary type of punches and may be varied if desired. The details of the punch block itself are shown in Figs. 3, 4, and 5 where it will be seen that the punch block F has a plurality of oil-conducting passageways g leading to each punch whereby the same may be supplied with oil which enters the back of the punch block and is regulated by a piston valve h which opens and closes the passageways i which communicate with punch holes g in the punch block. Any other suitable means, however, might be adopted to supply the punches with the requisite amount of oil.

G is a die holder shown in detail in Figs. 9 and 10 and which is supported in position beneath the punches by means of a bolster plate H which is bolted or otherwise secured to the main frame. The connection between the die holder and the bolster plate is preferably of a removable character and in the embodiment illustrated is formed by a dovetailed recess j in the bolster plate, into which the die holder extends. In the die holder are a plurality of apertures k within which the dies are secured, being held therein by means of set screws extending through holes l provided in the die plate. The bolster plate H has also a plurality of apertures m therein beneath the apertures k of slightly smaller diameter whereby they will support the die itself but permit the punch to go through and clear itself of the material cut. Between the dies and punches extends a nut stripper I, shown in detail in Figs. 23 and 24 and which prevents the nut rising with the punches. This nut stripper extends quite close to the nut ring and in the embodiment illustrated comprises a plate n having a plurality of apertures o therein through which the punches extend and also having integral therewith standards p and q which are secured to the upper frame B.

The nuts are presented to the operation of the punches by means of a nut-carrying ring J (shown in detail in Fig. 15) which is rotatably supported on bolster plates H which is, for that purpose, of the circular shape shown. The lateral movement of the ring is prevented by the bearing ring K' which is secured by bolts s to lugs r on the bolster plate. The nut carrying ring is provided with a plurality of apertures t which form with the bolster plate pockets adapted to receive the nuts, there being provided at one point in the bolster plate a slot u through which the nuts may drop into a suitable receiver when they have been slotted. The nut ring is intermittently rotated to bring each of the nuts successively into position beneath the punches by a suitable mechanism, that I have shown consisting of two reverse ratchet wheels K and L formed integral with the nut carrying ring and on which operate the feeding-pawl v and the stop-pawl w. These pawls may be operated by any suitable mechanism, the essential feature being that the stop-pawl locks the ring while the punching operation is being carried out. In the embodiment illustrated, both pawls are operated from a rock shaft M supported from the frame by bearings x and y having at one end thereof a crank z connected to the crank shaft by the means illustrated in Figs. 6, 7, 8 and 14. These means comprise a disk 3 secured to the crank shaft and having thereon a pin 4 which extends through a slot 5 and a bell crank lever 6 which is pivoted on the shaft 7 supported in a bearing 8 secured to the bracket B. The opposite arm of the bell crank of the lever 6 is provided with a slot 9 in which operates a pin 10 secured to a connecting link 11 the opposite end of which has a pin 12 which extends through the slot 13 in the crank z. By this means, as the disk 3 revolves, the bell crank is oscillated which oscillates the crank z through the connecting link 11. The connecting link 11 is made of light metallic material whereby it will possess a certain amount of flexibility for a purpose hereinafter described. The feed-pawl v is directly operated by the crank 14 secured on the rock shaft M and pivoted to the pawl. The stop-pawl w is normally held in engaged position by a tension spring 15 the opposite end of which is connected to the frame and which is intermittently moved out of engagement by the tappet 16 (Fig. 17) which is adapted, once every revolution, to engage the projecting piece 17 on the pawl w. The arrangements of the various elements of the mechanism is such that the stop-pawl is moved out of engagement with its ratchet wheel before the feed-pawl v starts to advance the ring. The crank disk 3 has a plurality of holes 50 in the periphery thereof, into which bars may be inserted to rotate the crank shaft by hand.

To prevent the operation of the machine when the nuts do not register with the punches, I provide the mechanism illustrated in detail in Fig. 22 and which consists of a lever N pivoted at 18 to the frame and having the opposite end 19 downwardly and horizontally curved and adapted to extend into the pockets in which the nuts are received after the same have been emptied. This lever has connected to it, intermediate of its length, a link bar 20 the opposite end of which is connected to the lever 21 intermediate of its length, one end of said lever being pivoted at 22 to the frame and the opposite end 23 being adapted in its uppermost position to engage the clutch pin 24, which when rotated, throws the clutch out of operation. The mechanism for doing this is well-known in the art and applied to practically all forms of similar punches and so need not be described herein in detail.

As the nut carrying ring is rotated, the end of the lever N is adapted to alternately extend into and ride over the pockets and when the ring is in position for punching, the end of the lever will be extending into the pockets. Thus, should the nut ring fail to register with the punches, the lever N will be in its raised position, raising the lever 21 in such a position that it will operate the clutch pin. In addition to providing these automatic means for stopping the machine, I provide a hand lever O pivoted at 25 to the frame and having intermediate of its length an operating rod 26 pivoted thereto which extends through the bearing 27 secured to the frame and has the opposite end thereof abutting the underside of the lever 21.

To minimize the wear on the punches I provide an automatic grinder P to remove the scale on that part of the nut in which the slot is to be cut. This consists essentially of a grinding wheel 28 of suitable material supported on the shaft 29 journaled in a bearing 31 which is vertically slidable in a slot 32 in the bracket 36 secured to the frame, being held therein by a pin 37 having an enlarged end. The grinding wheel is raised and lowered in vertical position by means of an arm 37, having a slot 39 therein into which the pin on the bearing 31 extends, the upper end of the arm 37 being turned horizontally and secured to an abutment 40 secured to the reciprocating punch block 7. By this means the grinding wheel comes in contact with the nut in the feed ring J and remains there until the ram travels two-thirds of the upper stroke thus allowing the wheel to remove the scale from the exact spot on the nut where the slot is to be cut. The grinding wheel itself is rotated in any suitable manner, preferably as shown, from a pulley 41 secured to the end of the shaft to which the driving belt will be secured.

The form of punch used in my machine is shown in Figs. 27 and 28 and consists of a cylindrical body 42 having an outwardly protruding tooth 43 on one side thereof which may be formed integral therewith but is preferably separable and secured in a dove tailed recess in the side of the body portion, whereby when worn out it may be removed and replaced without destroying the body portion. The punch has a central hole 44 for the introduction of oil and the tooth has a portion cut away to form a recess 45 with which the said oil passageways communicate.

The die used in my machine is shown in detail in Figs. 11, 12 and 13 and consists of a cylindrical body portion 46 provided with a central cylindrical hole 47 into which the body of the punch fits having a recess 48 at one side thereof into which the tooth on the side of the punch extends. To provide for the removal of the cuttings by the flow of oil, the recess 48 communicates with a laterally extending recess 49 through which the oil flows and carries the waste cuttings.

In the operation of the machine, the nuts are placed by hand in the nut ring while it is being intermittently rotated by the pawl and ratchet mechanism hereinbefore described. While the nut passes the grinding wheel P the same remains in contact for two-thirds of the upward stroke of the punch, removing the scale from the exact spot thereon on which the punch will operate. Continuing, each nut will be first moved into position beneath the first punch and operated on thereby. This first punch is arranged to take a cut which will remove the metal from the nut down to the depth of the thread. It will then be connected to the remaining four punches which will take cuts of successively increased depth until the final punch cuts the exact shape of hole desired in the nut. As soon as the nut comes opposite the aperture u in the bolster plate it will drop therethrough into a suitable receptacle.

Should the nuts fail to register with the punches, the operation of the lever N will operate the clutch pin 24, to throw the clutch out of operation. This clutch is normally thrown out when the punch block is in its uppermost position and the light connecting rod 11 of flexible metal gives sufficient play to allow the nut receiving ring to come into position.

The machine has been described herein with great particularity of detail, yet in carrying out the construction of the same, changes might be made therein without departing from the spirit of my invention.

What I claim as my invention is:—

1. In a nut slotting machine, the combination with the main frame and main shaft therein, a nut carrier, two ratchet wheels formed thereon, pawls engaging the ratchet wheels, a rock shaft, connecting means between the rock shaft and the pawls whereby one pawl actuates one ratchet wheel and the other pawl operates as a stop with the opposite ratchet wheel, a crank on the main shaft, a crank on the rock shaft, an intermediate crank, and connecting means between the intermediate crank and the cranks on the rock shaft and the main shaft.

2. In a nut slotting machine, the combination with the main frame and main shaft therein, a nut carrier, two ratchet wheels formed on the carrier, pawls engaging the ratchet wheels, an intermediate bell crank having slots in the arms thereof, one of said slots being adapted to engage the crank on the main shaft, and a connecting link having a pin engaging the slot in the opposite arm of the crank and having the opposite end thereof in engagement with the crank on the rock shaft and connecting means between the rock shaft and the pawls whereby one pawl actuates one ratchet wheel and the other pawl operates as a stop with the opposite ratchet wheel.

3. In a nut slotting machine, and in combination, means for punching slots in the sides of the holes of the nuts, a continuously-operating abrading means, a carrier adapted to transfer the nuts from the abrading means to the punching means, a loose connecting means between the punching means and the abrading means adapted to lower the latter and allow it to remain in contact for a short period with each nut.

4. In a nut slotting machine, the combination with the reciprocatable punch block and the nut carrier, of a grinding wheel, a shaft secured thereto, a bearing for the shaft, a bracket having a slot therein, a pin secured to the bearing and extending through a slot in the bracket, a pin on the bearing, an arm having a slot therein through which the pin extends and having the opposite end thereof connected to the punch block.

5. In a nut slotting machine, the combination with the driving mechanism and intermittently rotating nut carrier having pockets therein, of a lever having the end adapted to extend into the pockets when the nut carrier is registered with the punches and means operated by the raising of the lever for throwing the driving mechanism out of gear.

6. In a nut slotting machine, and in combination, a punch driving mechanism, a clutch for throwing the same in and out of gear, a clutch pin controlling the same, a nut carrier having pockets therein adapted to register with the punches, means for intermittently rotating the nut carrier a pivoted arm having one end adapted to extend into the pockets, means operated by the raising of the arm out of the pockets for actuating the clutch pin to throw the clutch out of gear.

7. In a nut slotting machine, the combination with a punch driving mechanism, and a clutch for throwing the same in and out of gear, a clutch pin controlling the same, a nut carrier having a plurality of pockets therein adapted to register with the punches, and means for intermittently rotating the nut carrier, of a pivoted arm having one end adapted to extend into the pockets, means operated by the raising of the arm out of the pockets for actuating the clutch pin to throw the clutch out of gear, and a separate pivoted hand-lever for actuating the clutch pin.

In witness whereof I have hereunto set my hand in the presence of two witnesses.

ALBERT LAWRENCE MOWRY.

Witnesses:
HARRISON A. McKEOWN,
E. MURRAY OLIVE.